(12) United States Patent
Shimojou et al.

(10) Patent No.: US 11,337,175 B2
(45) Date of Patent: May 17, 2022

(54) SLICE ASSIGNMENT METHOD

(71) Applicant: NTT DOCOMO, INC., Tokyo (JP)

(72) Inventors: Takuya Shimojou, Tokyo (JP); Shigeru Iwashina, Tokyo (JP); Masayoshi Shimizu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 650 days.

(21) Appl. No.: 16/325,800

(22) PCT Filed: Aug. 2, 2017

(86) PCT No.: PCT/JP2017/028014
§ 371 (c)(1),
(2) Date: Feb. 15, 2019

(87) PCT Pub. No.: WO2018/034147
PCT Pub. Date: Feb. 22, 2018

(65) Prior Publication Data
US 2021/0345283 A1    Nov. 4, 2021

(30) Foreign Application Priority Data

Aug. 17, 2016 (JP) .............................. JP2016-159922

(51) Int. Cl.
| | |
|---|---|
| *H04W 4/00* | (2018.01) |
| *H04W 60/04* | (2009.01) |
| *H04W 48/16* | (2009.01) |
| *H04W 48/18* | (2009.01) |

(52) U.S. Cl.
CPC ........... *H04W 60/04* (2013.01); *H04W 48/16* (2013.01); *H04W 48/18* (2013.01)

(58) Field of Classification Search
CPC ...... H04W 60/04; H04W 48/16; H04W 48/18
USPC .................................................. 370/329, 392
See application file for complete search history.

(56) References Cited

U.S. PATENT DOCUMENTS

| | | | |
|---|---|---|---|
| 8,862,178 B2 * | 10/2014 | Krishnaswamy ... | H04W 12/088 455/552.1 |
| 8,938,240 B2 * | 1/2015 | Farhadi ................. | H04W 16/14 455/436 |
| 10,084,643 B2 * | 9/2018 | Zhang ..................... | H04L 41/12 |
| 10,505,798 B2 * | 12/2019 | Zhang ..................... | H04W 4/70 |
| 10,536,946 B2 * | 1/2020 | Zhu ........................ | H04W 40/20 |

(Continued)

OTHER PUBLICATIONS

Office Action issued in the counterpart Chinese Patent Application No. 201780049574.X, dated May 6, 2021 (14 pages).

(Continued)

*Primary Examiner* — Marceau Milord
(74) *Attorney, Agent, or Firm* — Osha Bergman Watanabe & Burton LLP (57) ABSTRACT

In a slice management device 10, a storage request accepting unit 11 acquires correspondence information in which a service, a slice, and tracking areas are associated with each other. A presence-in-area identifying unit 13 identifies a presence-in-area status of a UE 130. An assignment unit 14 assigns a slice corresponding to a service used by the UE 130 and tracking areas represented by the correspondence information. In this case, the slice management device 10 assigns a slice to a service in accordance with the presence-in-area status of the UE 130, and accordingly, a slice assigned to the service can be dynamically changed.

3 Claims, 8 Drawing Sheets

(56) References Cited

U.S. PATENT DOCUMENTS

| | | | | |
|---|---|---|---|---|
| 10,608,928 B2* | 3/2020 | Zhang | .................... | H04L 45/30 |
| 10,645,528 B2* | 5/2020 | Vrzic | .................... | H04W 40/00 |
| 10,652,813 B2* | 5/2020 | Shimojou | ............. | G06F 9/5077 |
| 10,772,101 B2* | 9/2020 | Rong | .................... | H04W 76/11 |
| 2014/0280898 A1* | 9/2014 | Voit | ........................ | H04W 4/02 |
| | | | | 709/224 |
| 2016/0156513 A1* | 6/2016 | Zhang | .................... | H04W 4/70 |
| | | | | 709/220 |
| 2016/0353465 A1* | 12/2016 | Vrzic | ................ | H04W 28/0247 |
| 2017/0086118 A1* | 3/2017 | Vrzic | ................... | H04W 36/26 |
| 2017/0142024 A1* | 5/2017 | Fromentoux | ........... | H04L 47/70 |
| 2018/0337823 A1* | 11/2018 | Zhang | ................ | H04L 41/0806 |

OTHER PUBLICATIONS

Akihiro, Nakao; "Virtual Node Project Virtualization Technology for Building New-Generation"; National Institute of Information and Communication Technology; http://www.nict.go.jp/publication/NICT-News/1006/01.html, Jun. 2010 (12 pages).

Office Action issued in the counterpart Chinese Patent Application No. 201780049574.X, dated Nov. 30, 2020 (18 pages).

Office Action issued in European Application No. 17841374.6; dated Nov. 5, 2020 (4 pages).

3GPP TR 23.799 V0.7.0 "3rd Generation Partnership Project; Technical Specification Group Services and System Aspects; Study on Architecture for Next Generation System (Release 14)" Aug. 2016 (322 pages).

Extended European Search Report issued in European Application No. 17841374.6, dated Feb. 6, 2020 (8 pages).

Written Opinion of the International Searching Authority issued in PCT/JP2017/028014 dated Oct. 24, 2017 (4 pages).

International Preliminary Report on Patentability from PCT/JP2017/028014 dated Feb. 28, 2019 (2 pages).

Office Action in counterpart Chinese Patent Application No. 201780049574.X dated Oct. 11, 2021 (12 pages).

* cited by examiner

| SERVICE PARAMETER | TA | SLICE ID |
|---|---|---|
| XXX | TA6,7,10,11 | 2 |
| XXX | TA1-5,8,9,12-16 | 1 |
| YYY | TA1-16 | 1 |

*Fig.5*

| USER ID | SERVICE PARAMETER |
|---------|-------------------|
| AAA BBB ... | Car video ... |

SLICE ASSIGNMENT METHOD

TECHNICAL FIELD

The present invention relates to a method of assigning slices that are virtual networks generated on a network infrastructure.

BACKGROUND ART

In a network system using a conventional virtualization technology, by using a virtualization technology disclosed in Non-Patent Literature 1, hardware resources are virtually divided, and a slice that is a virtual network logically generated on a network infrastructure is generated. Then, by assigning services to slices, the services can be provided using networks of independent slices. In this way, in a case in which slices are assigned to services having various required conditions, required conditions of individual services can be easily satisfied, and a signaling process and the like thereof can be reduced.

CITATION LIST

Non Patent Literature

[Non-Patent Literature 1] Nakao Akihiro, "Virtualized node project virtualization technology targeting on new-generation network," "online," June 2010, National Institute of Information and Communications Technology, "retrieved on Aug. 4, 2016," the Internet http://www.nict.go.jp/publication/NICT-News/1006/01.html

SUMMARY OF INVENTION

Technical Problem

However, when a slice is uniquely assigned to a service, in a case in which a status in which the service is used changes (for example, a case in which a tracking area corresponding to a user changes), it is difficult to constantly assign an appropriate slice to the service.

The present invention is realized in consideration of the description presented above, and an object thereof is to provide a slice assignment method in which a slice assigned to a service is dynamically changed.

Solution to Problem

In order to achieve the object described above, according to one aspect of the present invention, there is provided a slice assignment method executed by a device assigning a slice that is a virtual network generated on a network infrastructure to a service using the virtual network, the slice assignment method comprising a correspondence information acquiring step of acquiring correspondence information that is information in which the service, the slice of an assignment destination of the service, and a tracking area are associated with each other; a presence-in-area status identifying step of identifying a presence-in-area status of a terminal; and an assignment step of assigning the slice corresponding to the service used by the terminal and the tracking area represented by the presence-in-area status identified in the presence-in-area status identifying step on the basis of the correspondence information acquired in the correspondence information acquiring step.

According to the slice assignment method described above, a slice is assigned to a service in accordance with a presence-in-area status of a terminal, and accordingly, a slice assigned to a service can be dynamically changed.

Advantageous Effects of Invention

A slice assigned to a service can be dynamically changed.

DESCRIPTION OF EMBODIMENTS

Hereinafter, a slice assignment method according to an embodiment will be described in detail with reference to the drawings. In description of the drawings, the same reference signs will be assigned to the same elements, and duplicate description thereof will be omitted.

Figure 1:
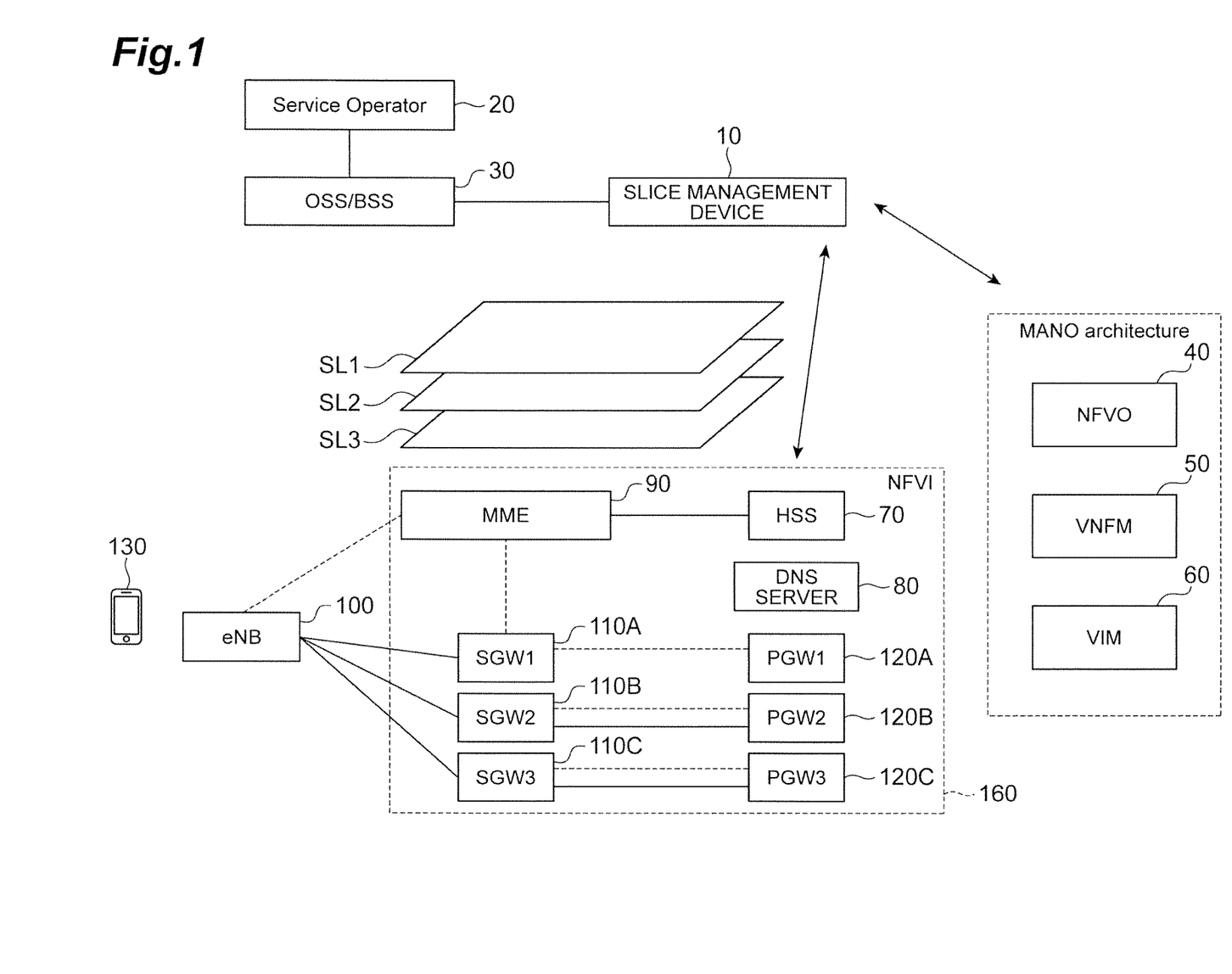
FIG. 1 is a diagram illustrating the configuration of a system according to an embodiment of the present invention.

FIG. 1 is a diagram illustrating the configuration of a system including a slice management device 10 (device) according to this embodiment. The system is a system that assigns a slice that is a virtual network to a service using the virtual network generated on a network infrastructure. A slice is a virtual network or a service network that is logically generated on a network infrastructure by virtually dividing resources of links and nodes of a network device and combining the divided resources, and slices divide the resources and thus do not interfere with each other. A service is a service using network resources such as a communication service (a dedicated line service or the like) or an application service (moving image distribution or a service using a sensor device such as an embedded device).

As illustrated in FIG. 1, the system is configured to include a slice management device 10, a service operator (SO) 20, an operations support system/business support system (OSS/BSS) 30, an NFVO 40, a VNFM 50, virtualized infrastructure management (VIM) 60, a home subscriber server (HSS) 70, a domain name system (DNS) server 80, a mobility management entity (MME) 90, an eNB 100, a serving gateway (SGW) 110, a packet data network gateway (PGW) 120, and a user equipment (UE) 130. Among these, the NFVO 40, the VNFM 50, and the VIM 60 are management & orchestration (MANO) architectures.

Such constituent elements configure a core network of the system. Constituent elements required to transmit/receive information to/from each other are connected using a wire or the like, and thus the transmission/reception of information can be performed.

The system according to this embodiment provides a communication function for a mobile communication terminal using a virtual server that operates on a virtual machine realized on a physical server. In other words, the system is a virtual mobile communication network. The virtual machine executes a communication process according to the communication function, and thus the communication function is provided for the mobile communication terminal.

The slice management device 10 is a node that performs service management (association between a slice and a service) in the system and gives an instruction relating to a communication function of the system. In addition, the slice management device 10 can be operated by a communication company relating to the system.

The service operator (SO) 20 is a device requesting a service and, for example, is a terminal device (for example, a personal computer or the like) of a company providing services for various users using a virtual network.

The OSS/BSS 30 is a device that accepts a service request from the SO 20 and transmits information based on the request to the slice management device 10. This OSS/BSS 30 associates a service parameter used for identifying a service that is a target for the service request, a slice to be associated with the service parameter (a slice ID representing the slice), and a tracking area with each other and transmits associated information to the slice management device 10. Here, a tracking area corresponds to a routing area and is composed of one or a plurality of cells. The OSS/BSS 30 may receive correspondence information from the SO 20 and transmit the correspondence information to the slice management device 10.

The NFVO 40 is a total management node (a functional entity) managing a total virtual network (slice) built on an NFVI 160 that is a physical resource. The NFVO 40 receives an instruction from a device instructing generation of a slice and performs a process according to the instruction. The NFVO 40 performs management over the total virtualization network built using the infrastructure and physical resources of a mobile communication network of a communication service. The NFVO 40 realizes a communication service provided by a virtual network at an appropriate place through the VNFM 50 and the VIM 60. For example, the NFVO 40 performs management of a lifecycle of a service (more specifically, for example, generation, update, scale control, and event collection), management of distribution, reservation, and assignment of resources over the entire mobile communication network, and management of service instances and management of policies (more specifically, for example, reservation and assignment of resources and optimal arrangement based on geography, laws, and the like).

The VNFM 50 is a virtual communication function managing node (a functional entity) that adds a function relating to a service to the NFVI 160 that becomes physical resources (a node). A plurality of VNFMs 50 may be disposed in the system.

The VIM 60 is a physical resource managing node (a functional entity) managing each physical resource (node). More specifically, the VIM 60 performs management of assignment, update, and recovery of resources, association between physical resources and virtualized networks, and management of lists of hardware resources and SW resources (hypervisors). Generally, the VIM 60 performs management for each data center (station). The management of physical resources is performed in a system according to the data center. As management systems of data centers (a system for mounting management resources), there are types of OPENSTACK, vCenter, and the like. Generally, the VIM 60 is disposed for each management system of the data center. In other words, a plurality of VIMs 60 managing physical resources of the NFVI 160 in different systems are included. In addition, units of physical resources managed in different management systems may not necessarily be units of data centers.

In addition, the NFVO 40, the VNFM 50, and the VIM 60 are realized by executing programs on a physical server device (here, the realization is not limited to virtualization, but may be realized through virtualization after a management system is divided). The NFVO 40, the VNFM 50, and the VIM 60 may be either realized by different physical server apparatuses or realized by the same server apparatus. The NFVO 40, the VNFM 50, and the VIM 60 (programs for realizing them) may be provided from different vendors.

When a slice generation request is received, the NFVO 40 requests the VIM 60 to secure resources for slices (slices SL1, SL2, and the like). When the VIM 60 secures resources of server apparatuses and switches configuring physical resources, the NFVO 40 defines slices for these physical resources.

In addition, when the VIM 60 is caused to secure physical resources, the NFVO 40 stores information defining a slice for the physical resources in a table stored by the NFVO 40. Then, the NFVO 40 requests the VNFM 50 to install software for realizing functions required for the service. In response to the installation request, the VNFM 50 installs the software described above in the physical resources (a node such as a server apparatus, a switch device, or a router device) secured by the VIM 60.

When the software is installed by the VNFM 50, the NFVO 40 performs mapping between a slice and a service in the table stored by the NFVO 40. Slices SL1 to SL3 are slices that are units for assigning services.

Figure 2:
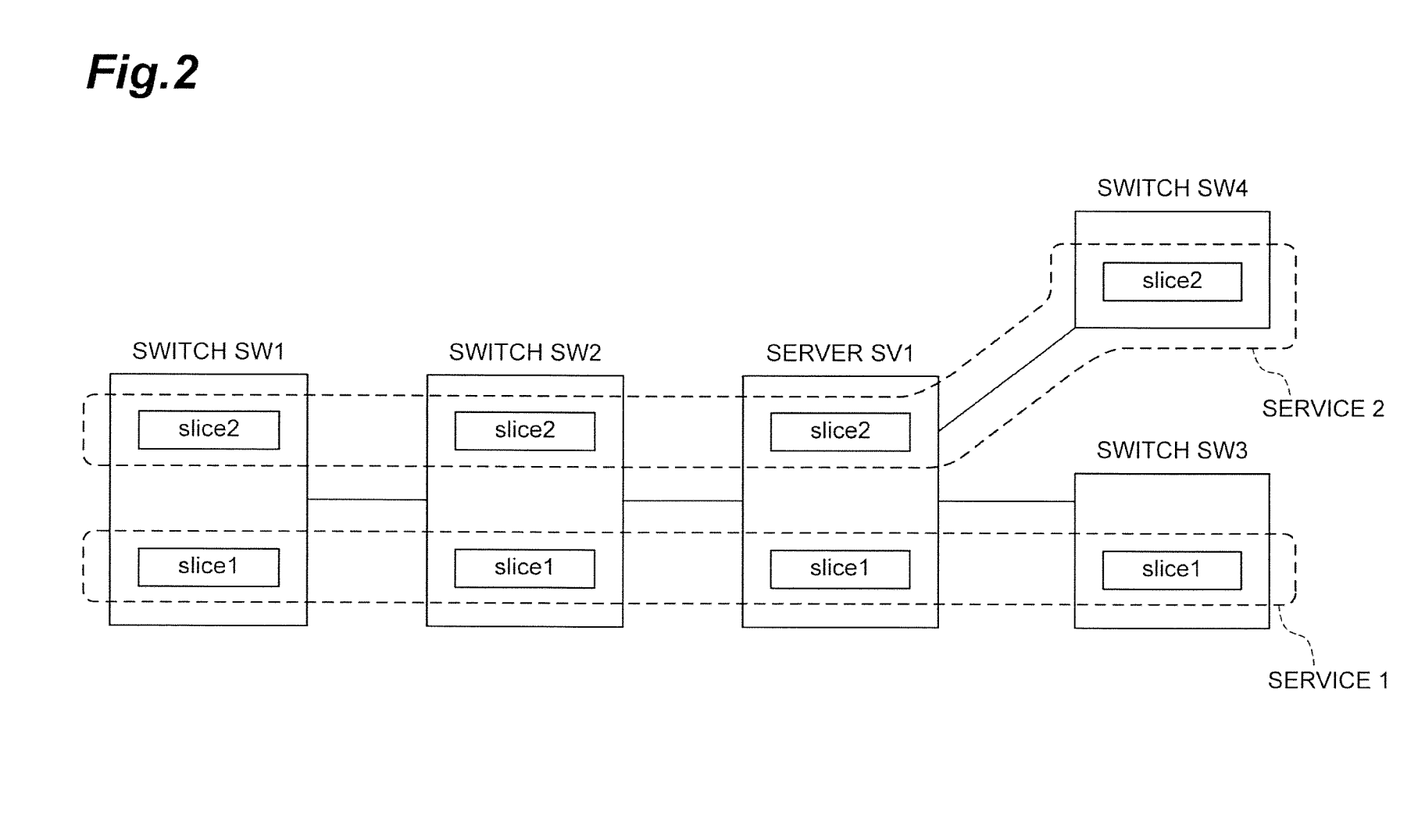
FIG. 2 is a diagram illustrating a correspondence relation between slices and resources.

For example, as illustrated in FIG. 2, when the NFVO 40 requests the VIM 60 to secure resources for slices (Slice 1 and Slice 2), the VIM 60 gives an instruction indicating such a request to a switch SW1, a switch SW2, a server SV1, and a switch SW3. Then, the switch SW1, the switch SW2, the server SV1, and the switch SW3 secure resources for the slice 1. Similarly, in accordance with an instruction from the VIM 60, the switch SW1, the switch SW2, the server SV1, and the switch SW4 secure resources for the slice 2.

The NFVI 160 that is the physical resource described above represents a network that is formed from physical resources (a node group) configuring a virtualized environment. Conceptually, these physical resources include calculation resources, storage resources, and transmission resources. More specifically, these physical resources are configured to include nodes such as a physical server that is a physical server apparatus performing a communication process in the system, a switch, and the like. The physical server is configured to include a CPU (a core; a processor), a memory, and a storage means such as a hard disk. Generally, a plurality of nodes such as a physical server configuring the NFVI 160 and the like are arranged together at a base such as a data center (DC). In the data center, the arranged physical servers are connected through an internal network of the data center and are configured to be able to transmit/receive information to/from each other. In addition, a plurality of data centers are disposed in the system. The data centers are connected through a network, and physical servers disposed at different data centers can transmit/receive information to/from each other through the network.

As described above, by adding various functions to the NFVI 160 that becomes a physical resource (node) using the VNFM 50, the NFVI 160 realizes the functions of the HSS 70, the DNS server 80, the MME 90 (communication device), the SGW 110, and the PGW 120.

The HSS 70 has a function of managing subscriber information including contract information of communication terminals such as the UE 130, authentication information, communication service information, terminal type information, and presence-in-area information as a database. Here, the communication service information is information that defines a type of communication service used by each UE 130. In the communication service information, information used for identifying a UE 130 (for example, an international mobile subscriber identity (IMSI)) and a service type representing requirements of a communication service used by the UE 130 are included. In addition, as will be described later, the HSS 70 stores a user ID and information representing a service used by the UE 130 indicated by the user ID.

The DNS server 80 has a function of managing a correspondence relation between a domain name or a host name and an IP address on the network. Furthermore, the DNS server 80 stores information in which information used for identifying a slice (for example, a slice ID) and an address of the SGW 110 are associated with each other. When a request for transmitting an address is received from the slice management device 10, the DNS server 80 transmits an address of the SGW 110 according to the request to the MME 90.

The MIME 90 has a function of performing position management and authentication control of a user terminal (UE 130) that is present in a Long Term Evolution (LIE) network and a process of setting a communication path of user data between the SGW 110 and the UE 130. In other words, the MIME 90 is a communication device that is communicatively connected to the UE 130. The MIME 90 manages a tracking area of a predetermined range. The MME 90 stores information representing a tracking area to which the UE 130 currently belongs (presence-in-area information). For example, the MIME 90 stores information (a user ID) used for identifying a UE 130 and information representing a tracking area to which the UE 130 belongs in association with each other. The MME 90 can communicate with the slice management device 10. When a request for a list of users belonging to a predetermined tracking area is received from the slice management device 10, the MME 90 generates a list of user IDs belonging to the tracking area by referring to the presence-in-area information described above and transmits the generated list to the slice management device 10.

In addition, when a user ID and a tracking area of a movement destination are received from the UE 130, and a request for updating a tracking area is received, the MME 90 transmits the user ID and the tracking area of the movement destination to the slice management device 10. In addition, when a user ID and an address of the SGW 110 for which a bearer needs to be established are received from the slice management device 10, the MME 90 stores information in which the user ID and the address of the SGW 110 are associated with each other and performs a bearer establishment process using the information. For example, when an attachment request is received from the user ID, the MME 90 requests the SGW 110 corresponding to the correspondence information to establish a bearer. In addition, instead of receiving an address of the SGW 110 from the slice management device 10, by receiving a slice ID and transmitting the slice ID to the DNS server 80 and requesting acquisition of an address of an SGW 110 corresponding to the slice ID (an SGW 110 for which a bearer needs to be established for using a slice represented by the slice ID), the MIME 90 may acquire the address of the SGW 110 from the DNS server 80.

The eNB 100 is a radio base station connected to the MME 90 and a device having a radio access control function.

The SGW 110 transmits and receives user data used for providing a communication service for communicating with a packet data network gateway (PGW) 120 using a function of a presence-in-area packet exchanges that houses the LTE. A plurality of SGWs 110 are disposed in correspondence with requirements of a plurality of communication services.

The PGW 120 is a junction with a packet data network (PDN) and is a gateway that performs assignment of an IP address, transmission of a packet to the SGW 110, and the like.

Figure 3:
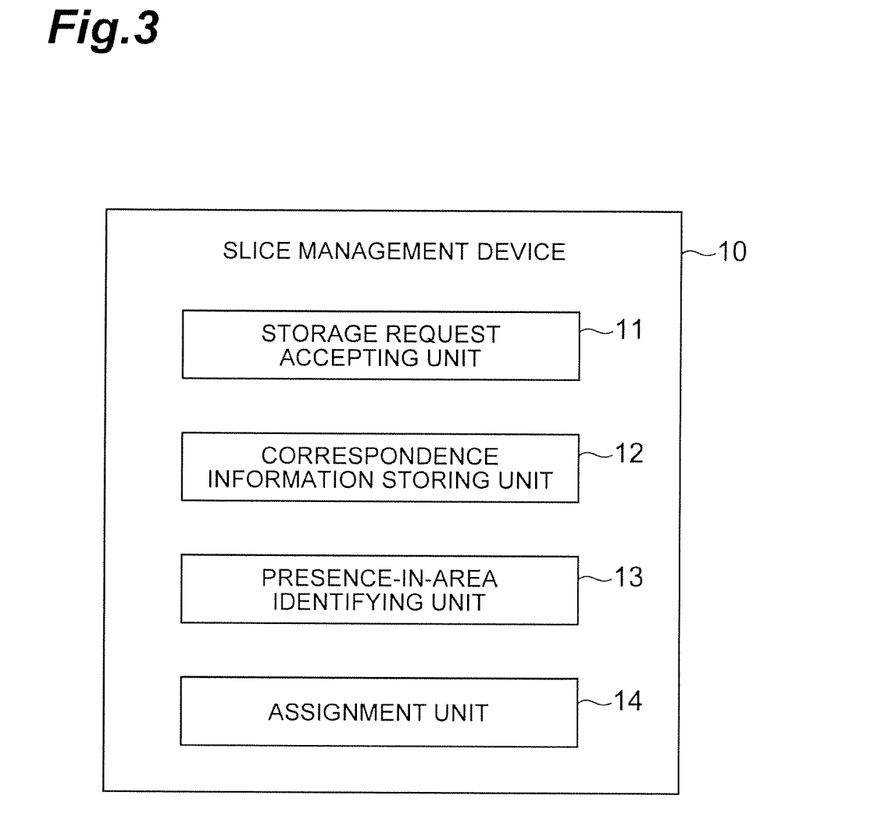
FIG. 3 is a block diagram of a slice management device according to an embodiment of the present invention.

Subsequently, the function of the slice management device 10 relating to this embodiment will be described with reference to FIG. 3.

Referring back to FIG. 3, the function of the slice management device 10 will be described. As illustrated in FIG. 3, the slice management device 10 includes a storage request accepting unit 11, a correspondence information storing unit 12, a presence-in-area identifying unit 13, and an assignment unit 14.

The storage request accepting unit 11 is a part that receives correspondence information from the OSS/BSS 30 and accepts a storage request for storing correspondence information. When a storage request for storing correspondence information is received from the OSS/BSS 30 and receives the correspondence information, the storage request accepting unit 11 stores the correspondence information in the correspondence information storing unit 12 and transmits the correspondence information to the presence-in-area identifying unit 13. In this way, the storage request accepting unit 11 acquires new correspondence information.

Figure 4:
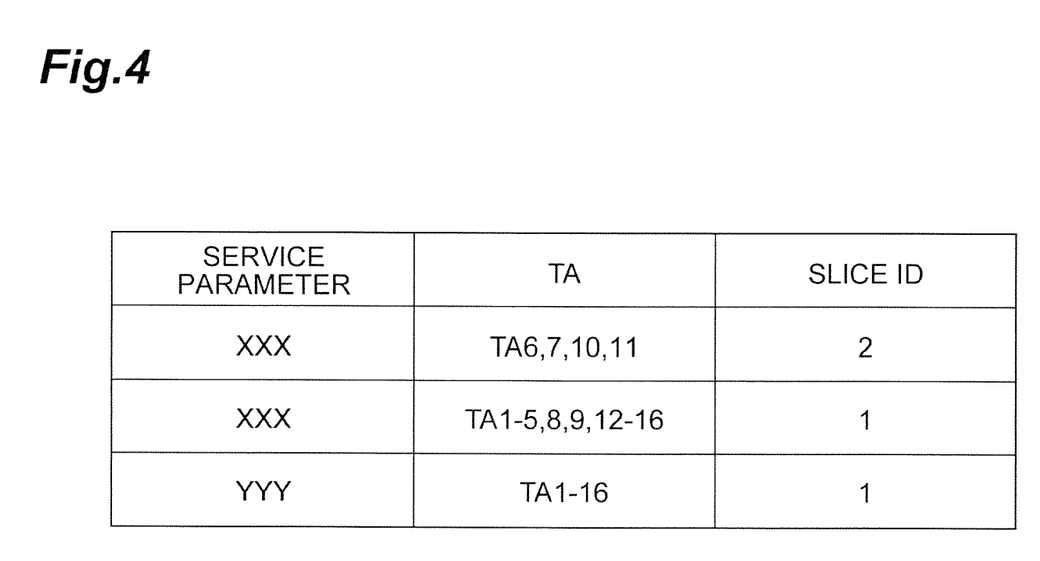
FIG. 4 is a diagram illustrating a correspondence information table.

The correspondence information storing unit 12 is a part that stores correspondence information. FIG. 4 illustrates a correspondence information table. As illustrated in FIG. 4, the correspondence information table stores information in which a "service parameter" field, a "TA" field, and a "slice ID" field are associated with each other. Here, information of the "service parameter" field, the "TA (tracking area)" field, and the "slice ID" field is information received from the OSS/BSS 30. In the example illustrated in FIG. 4, a service parameter "XXX" input to the "service parameter" field, tracking areas "TA6, 7, 10, 11" input to the "TA" field, and a slice of which the "slice ID" is "1" are associated with each other. In other words, it is represented that a slice ID "2" is assigned to the service parameter "XXX" in the tracking areas "TA6, 7, 10, and 11." The slice ID described above becomes a slice ID of the assignment destination. In addition, assigning a slice to a service represents that the service is caused to be in a usable state using the slice. Causing a service to be in a usable state using a slice includes establishment of a bearer for using a slice (for example, requesting the MIME 90 to establish a bearer) and the like.

The presence-in-area identifying unit 13 is a part that identifies a presence-in-area status of a UE 130. Here, the presence-in-area status represents identification of a tracking area in which the UE 130 is present. In other words, presence-in-area status represents identification of a correspondence relation between a UE 130 and a tracking area. More specifically, when correspondence information accepted by the storage request accepting unit 11 is acquired from the storage request accepting unit 11, the presence-in-area identifying unit 13 transmits a tracking area included in the correspondence information to the MME 90 and requests transmission of a user list. The user list is a list of information representing UEs 130 that are present in the tracking areas described above. For example, a list of user IDs of UEs 130 present in the tracking areas described above is set as a user list. When a user list is received from the MME 90, the presence-in-area identifying unit 13 transmits user IDs included in the user list to the HSS 70.

Figure 5:
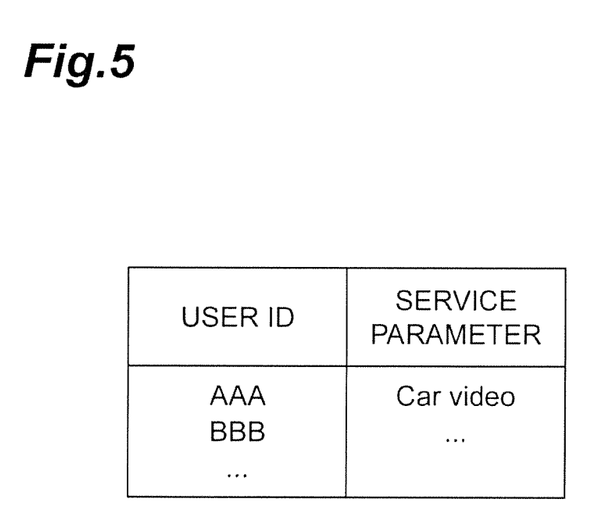
FIG. 5 is a diagram illustrating a user use service table.

The HSS 70, as illustrated in FIG. 5, stores information in which a "user ID" field and a "service parameter" field are associated with each other. Into the "user ID" field, a user ID that is information used for identifying a user is input. Into the "service parameter" field, a service parameter is input. When a user ID is received from the slice management device 10, the HSS 70 transmits a service parameter corresponding to the user ID to the slice management device 10 by referring to the stored information.

The presence-in-area identifying unit 13 receives a service parameter transmitted by the HSS 70 and identifies a user ID of which the service parameter is the same as the service parameter of the correspondence information acquired from the storage request accepting unit 11. The presence-in-area identifying unit 13 transmits the identified user ID, the correspondence information, and information indicating that new correspondence information have been acquired to the assignment unit 14. In this way, by being triggered upon acquisition of new correspondence information, the presence-in-area identifying unit 13 transmits the user ID, the new correspondence information, and the information indicating that the new correspondence information has been acquired to the assignment unit 14.

In addition, when tracking areas and the user ID of the UE 130 are acquired from the MME 90 in accordance with a tracking area update using the UE 130, the presence-in-area identifying unit 13, as described above, acquires a service parameter corresponding to the user ID from the HSS 70. The presence-in-area identifying unit 13 acquires corresponding information corresponding to the acquired service parameter and the tracking areas described above from the correspondence information storing unit 12. Subsequently, the presence-in-area identifying unit 13 transmits the user ID of the UE 130, the correspondence information, and information indicating that there has been a tracking area update to the assignment unit 14. In this way, by being triggered upon a tracking area update using the UE 130, the presence-in-area identifying unit 13 transmits the user ID, the correspondence information, and the information indicating that there has been a tracking area update to the assignment unit 14.

The assignment unit 14 is a part that assigns a slice corresponding to the service used by the UE 130 and tracking areas represented by the presence-in-area status identified by the presence-in-area identifying unit 13 based on the correspondence information. In a case in which the user ID, the correspondence information, and the information indicating new correspondence information has been acquired are acquired from the presence-in-area identifying unit 13, the assignment unit 14 acquires an address of an SGW 110 corresponding to the slice 11) included in the acquired correspondence information from the DNS server 80. The assignment unit 14 transmits the address of the SGW 110, the user ID and a list of tracking areas included in the correspondence information to the MME 90.

In addition, in a case in which the user ID, the correspondence information, and the information indicating that there has been a tracking area update are acquired from the presence-in-area identifying unit 13, the assignment unit 14 acquires an address of an SGW 110 corresponding to the slice ID included in the acquired correspondence information from the DNS server 80. The assignment unit 14 transmits the address of the SGW 110 and the user ID to the MME 90.

As described above, when the assignment unit 14 transmits the address of the SGW 110 and the user ID to the MME 90, the MME 90 establishes a bearer in the SGW 110 for the UE 130 of the user ID using a known technology. In addition, in a case in which information indicating new correspondence information has been acquired is acquired, the assignment unit 14 transmits tracking areas of the correspondence information to the MIME 90. In accordance with this, the MME 90 transmits a tracking list having tracking areas of the correspondence information to a UE 130 belonging to one of tracking areas managed by the MME 90.

Figure 6:
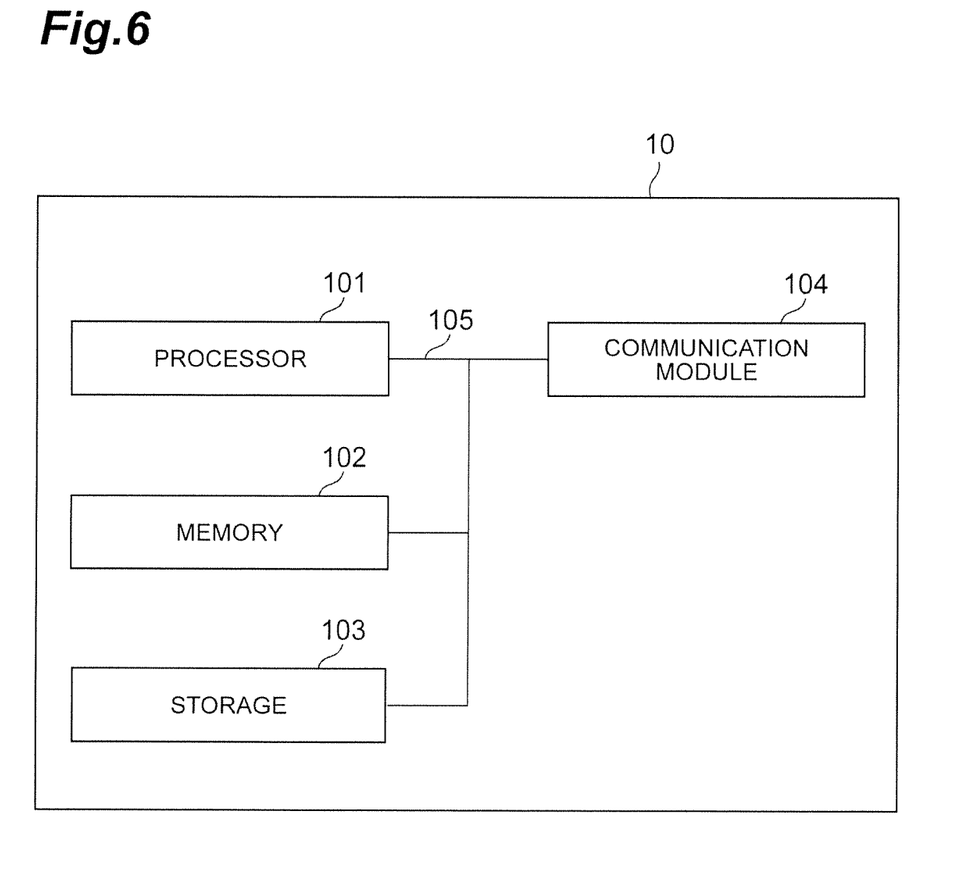
FIG. 6 is a hardware configuration diagram of a slice management device.

Next, FIG. 6 illustrates the hardware configuration of the slice management device 10 according to this embodiment. Functional blocks (constituent units) of the slice management device 10 is realized by an arbitrary combination of hardware and/or software. In addition, a realizing means of each of the functional blocks is not particularly limited. In other words, each of the functional blocks may be realized by one device that is combined physically and/or logically or may be realized by directly and/or indirectly (for example, using a wire and/or radiowaves) connecting two or more devices, which are physically and/or logically divided and using a plurality of the devices.

For example, the slice management device 10 and the like according to one embodiment of the present invention may function as a computer managing slices. The slice management device 10 described above may be configured physically as a computer device including a processor 101, a memory 102, a storage 103, a communication module 104, and the like.

In addition, in the following description, a term "device" may be rephrased with a circuit, a device, a unit, or the like. The hardware configuration of the slice management device 10 may be configured to include one or a plurality of devices illustrated in the drawing or may be configured not to include some devices.

Each function of the slice management device 10 is realized by causing the processor 101 to perform an arithmetic operation by causing predetermined software (program) to be read on hardware such as the processor 101 or the memory 102 and controlling communication using the communication module 104 and data read and/or write for the memory 102 and the storage 103.

The processor 101, for example, controls the entire computer by operating an operating system. The processor 101 may be configured using a central processing unit (CPU) including an interface for a peripheral device, a control device, an arithmetic operation device, a register, and the like. For example, the storage request accepting unit 11, the presence-in-area identifying unit 13, the assignment unit 14, and the like may be realized using the processor 101.

In addition, the processor 101 reads a program (program code), a software module, and data from the storage 103 and/or the communication module 104 into the memory 102 and executes various processes in accordance therewith. As the program, a program causing a computer to execute at least some of the operations described in the embodiment described above is used. For example, the slice management device 10 may be realized by a control program that is stored in the memory 102 and is operated by the processor 101, and the other functional blocks may be similarly realized. While various processes described above have been described as being executed by one processor 101, the processes may be executed by two or more processors 101 simultaneously or sequentially. The processor 101 may be mounted using one or more chips. In addition, the program may be transmitted from a network through a telecommunication line.

The memory 102 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 102 may be referred to as a register, a cache, a main memory (a main storage device), or the like. The memory 102 can store a program (a program code), a software module, and the like executable for performing a radio communication method according to one embodiment of the present invention.

The storage 103 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 103 may be referred to as an auxiliary storage device. The storage medium described above, for example, may be a database including the memory 102 and/or storage 103, a server, or any other appropriate medium.

The communication module 104 is hardware (a transmission/reception device) for performing inter-computer communication through a wired and/or wireless network and, for example, may be called also as a network device, a network controller, a network card, or the like.

In addition, each device such as the processor 101 or the memory 102 is connected to a bus 105 for communication of information. The bus 105 may be configured as a single bus or buses different between devices.

In addition, the slice management device 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 101 may be mounted using at least one of such hardware components. The configuration of the slice management device 10 according to this embodiment has been described as above.

Figure 7:
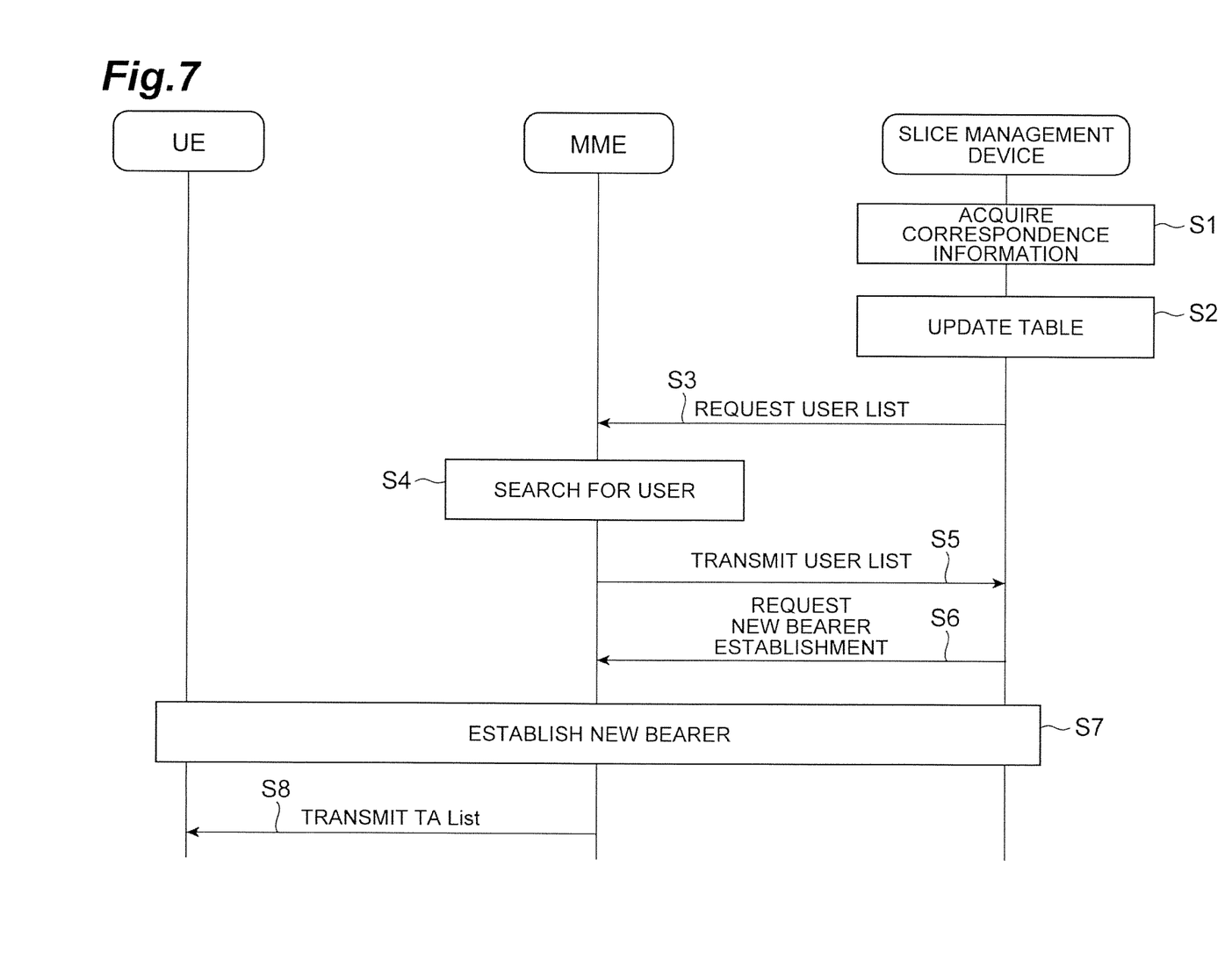
FIG. 7 is a sequence diagram illustrating a process of establishing a new bearer with acquisition of new correspondence information as a trigger.
Figure 8:
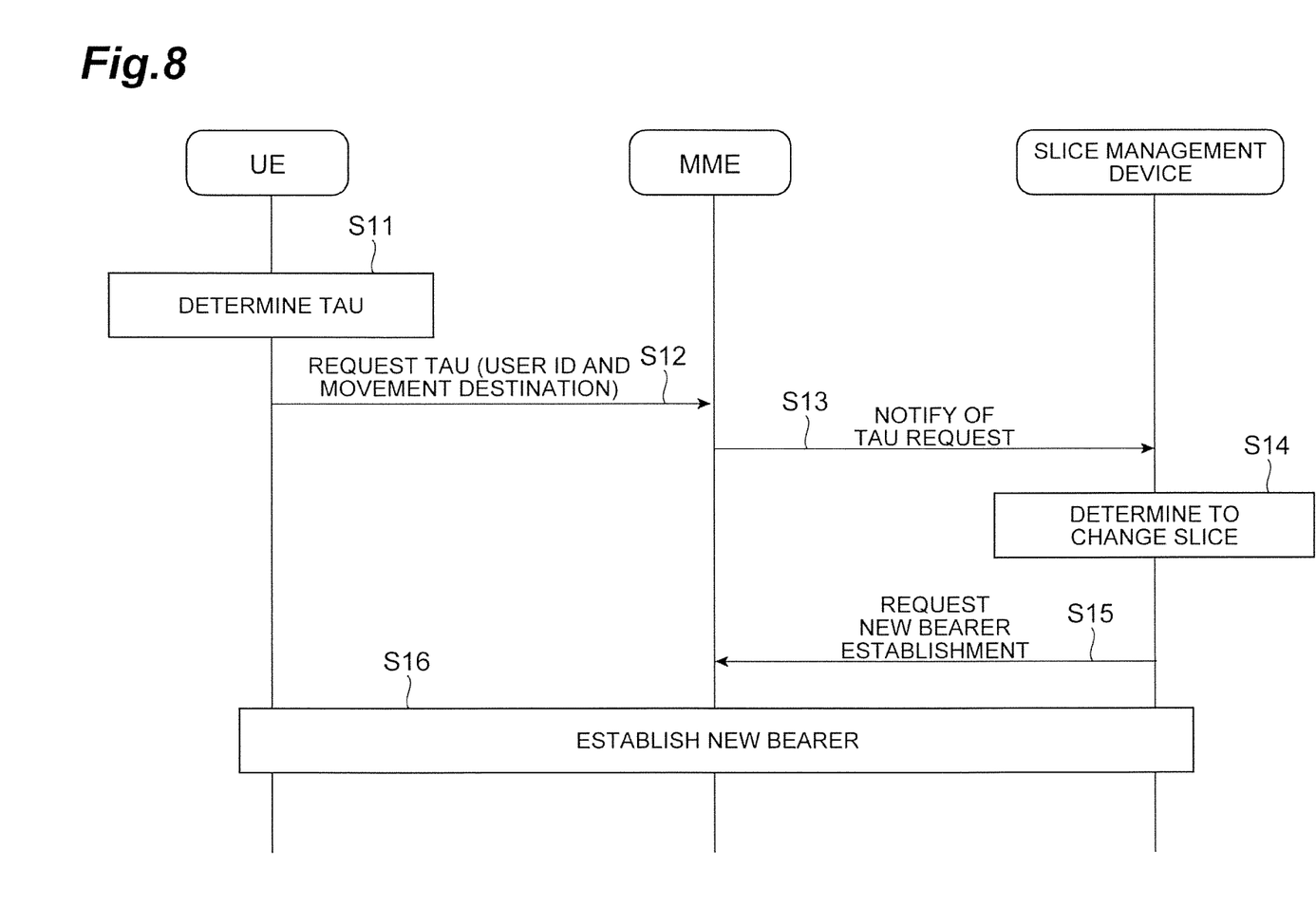
FIG. 8 is a sequence diagram illustrating a process of establishing a new bearer with an update of a tracking area as a trigger.

Subsequently, processes executed by the system according to this embodiment will be described with reference to sequence diagrams illustrated in FIGS. 7 and 8. FIG. 7 is a sequence diagram of a process triggered upon new acquisition of correspondence information. FIG. 8 is a sequence diagram illustrating a process triggered upon a tracking area update. First, description will be presented with reference to FIG. 7.

First, in the slice management device 10, the storage request accepting unit 11 acquires correspondence information from the OSS/BSS 30 (Step S1). Subsequently, the storage request accepting unit 11 stores the correspondence information described above in the correspondence information storing unit 12 of the slice management device 10 (Step S2). Subsequently, the presence-in-area identifying unit 13 of the slice management device 10 transmits tracking areas included in the acquired correspondence information to the MME 90 and requests a user list (Step S3). The MME 90 searches for user IDs of UEs 130 present in the acquired tracking areas (Step S4). The MIME 90 transmits a list of the retrieved user IDs to the slice management device 10 (Step S5). The assignment unit 14 of the slice management device 10 transmits an address of an SGW 110 corresponding to a slice ID of the correspondence information, a user ID, and tracking areas of the correspondence information to the MME 90 and requests newly establish a bearer (Step S6).

The MME 90 newly establishes a bearer (Step S7) and transmits a tracking area list including tracking areas of the correspondence information to the UE 130 (Step S8).

Subsequently, the process triggered upon a tracking area update will be described with reference to FIG. 8. First, the UE 130 determines a change in the tracking areas using a known technology (Step S11). In a case in which there is a change, the UE 130 transmits a user ID and a tracking area of a movement destination to the MIME 90 and requests the MME 90 to update tracking areas (Step S12). The MME 90 notifies the slice management device 10 of the user ID and the tracking area of the movement destination (Step S13). The presence-in-area identifying unit 13 of the slice management device 10 acquires correspondence information corresponding to the acquired tracking area and a service parameter corresponding to the user ID (Step S14). The assignment unit 14 transmits the user ID and the correspondence information to the MME 90 and requests new establishment of a bearer (Step S15). The MME 90 newly establishes the bearer (Step S16).

In the embodiment described above, a case in which a service parameter is associated with tracking areas has been described. Instead of this service parameter, information that can identify a service such as a UE usage type, a service type, an access point name (APN), or a dedicated core network (DCN) may be used. For example, the service parameter described above may be replaced with information in which a service type and an APN are associated with other or information in which a service type and a DCN ID are associated with each other.

In the embodiment described above, although a case in which the slice management device 10 is an independent device has been described, the slice management device 10 may be built in another device. For example, the MME 90 or the eNB 100 may function as the slice management device 10.

In addition, in the embodiment described above, a case in which the slice management device 10 requests the MME 90 to establish a bearer has been described. Instead of this, the slice management device 10 may request another device to establish a bearer. Examples of another device include a communication control device (common C-plane node) having the function of the MME 90 and a device (a C-plane node) that transmits and receives control signals using a control plane that is a path along which the control signals used for providing a communication service used by a UE 130 are transmitted.

Next, operations and effects of the system according to this embodiment will be described. In the slice management device 10, the storage request accepting unit 11 acquires correspondence information in which a service, a slice, and a tracking areas are associated with each other. The presence-in-area identifying unit 13 identifies a presence-in-area status of the UE 130. The assignment unit 14 assigns a slice corresponding to a service used by the UE 130 and tracking areas represented by the correspondence information.

In this case, the slice management device 10 assigns a slice to the service in accordance with the presence-in-area status of the UE 130, and accordingly, a slice assigned to the service can be dynamically changed. For example, the slice management device 10 can assign a slice in accordance with a tracking area to which the UE 130 belongs also in the same service. For example, a slice corresponding to a certain local government can be assigned to a service representing an event hosted by the local government. In other words, a dedicated slice (for example, a low-latency broadband slice realizing a relay of marathon) can be assigned to a service used by a UE 130 belonging to a tracking area corresponding to the local government.

In addition, by being triggered upon acquisition of new correspondence information, the slice management device 10 assigns a slice of the correspondence information to a service used by a UE 130 present in a tracking area included in the correspondence information, and accordingly, a slice can be dynamically changed for the UE 130 that is present in a tracking area of new correspondence information.

In addition, since the assignment unit 14 transmits tracking areas of the correspondence information to the MIME 90, the MME 90 can be caused to transmit a list of tracking areas to a UE 130 belonging to a tracking area managed by the MME 90. Accordingly, among tracking areas managed by the MME 90, for a UE 130 present in a tracking area other than the tracking areas of new correspondence information, a slice can be changed in accordance with a tracking area update.

In addition, the slice management device 10 assigns a slice of the correspondence information to a service used by a UE 130 for which a tracking area update has been performed with the tracking area update using the UE 130 as a trigger, and accordingly, a slice based on the tracking area can be assigned in accordance with the tracking area update. In other words, a slice can be dynamically changed.

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, a signal, and the like described in this specification may be represented using any one among other various technologies. For example, data, an instruction, a command, information, a signal, a bit, a symbol, a chip, and the like described over the entire description presented above may be represented using a voltage, a current, radiowaves, a magnetic field or magnetic particles, an optical field or photons, or an arbitrary combination thereof.

In addition, a term described in this specification and/or a term that is necessary for understanding this specification may be substituted with terms having the same meaning or a meaning similar thereto.

Terms "system" and "network" used in this specification are compatibly used.

In addition, information, a parameter, and the like described in this specification may be represented using absolute values, relative values from predetermined values, or other corresponding information. For example, radio resources may be instructed using indices.

Terms such as "determining" used in this specification includes various operations of various types. The "determining," for example, may include a case in which judging, calculating, computing, processing, deriving, investigating, looking up (for example, looking up a table, a database, or any other data structure), or ascertaining is regarded as "determining." In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining." In other words, "determining" includes a case in which a certain operation is regarded as "determining."

Description of "on the basis of" used in this specification does not mean "only on the basis of" unless otherwise mentioned. In other words, description of "on the basis of" means both "only on the basis of" and "at least on the basis of."

In addition, a "means" in the configuration of each device described above may be replaced with a "unit," a "circuit," a "device," or the like.

As long as "including," "comprising," and modifications thereof are used in this specification or the claims, such terms are intended to be inclusive like a term "comprising." In addition, a term "or" used in this specification or the claims is intended to be not an exclusive logical sum.

In the entire disclosure, for example, in a case in which articles such as "a," "an" and "the" in English are added through translation, as long as such articles are not clear on the basis of the context, those include plural forms.

Each aspect/embodiment described in this specification may be applied to long term evolution (LTE), LTE-advanced (LTE-A), Super 3G, IMT-advanced, 4G, 5G, future ratio access (FRA), W-CDMA (Registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), a system using another appropriate system and/or a next generation system extended based on these.

The processing order, the sequence, the flowchart, and the like of each aspect/embodiment described in this specification may be changed in order as long as there is no contradiction. For example, in a method described in this specification, elements of various steps are presented in an exemplary order, and the method is not limited to the presented specific order.

The input/output information and the like may be stored in a specific place (for example, a memory) or managed using a management table. The input/output information and the like may be overwritten, updated, or additionally written. The output information and the like may be deleted. The input information and the like may be deleted. The input/output information and the like may be transmitted to another device.

The aspects/embodiments described in this specification may be individually used, used in combination, or be switched therebetween in accordance with execution. In addition, a notification of predetermined information (for example, a notification of "being X") is not limited to be performed explicitly and may be performed implicitly (for example, a notification of the predetermined information is not performed).

In the entire present disclosure, not so long as being a single is clearly represented, both being a single and being two or more are included.

As above, while this embodiment has been described in detail, it is apparent to persons skilled in the art that this embodiment is not limited to the embodiments described in this specification. This embodiment can be performed as a modified and changed aspect without departing from the concept and the scope of the present invention defined by the claims. Thus, description of this specification is for the purpose of exemplary description and does not have any meaning for limiting this embodiment.

REFERENCE SIGNS LIST

10 Slice management device
11 Storage request accepting unit
12 Correspondence information storing unit
13 Presence-in-area identifying unit
14 Assignment unit
20 SO
30 OSS/BSS
40 NFVO
50 VNFM
60 VIM
70 HSS
80 DNS server
90 MME
100 eNB
101 Processor
102 Memory
103 Storage
104 Communication module
105 Bus
110 SGW
120 PGW
130 UE
160 NFVI

The invention claimed is:

1. A slice assignment method executed by a device assigning a slice that is a virtual network generated on a network infrastructure to a service using the virtual network, the slice assignment method comprising:
   acquiring a correspondence information, in which the service, the slice of an assignment destination of the service, and a tracking area are associated with each other;
   identifying a presence-in-area status of a terminal; and
   assigning the slice corresponding to the service used by the terminal and the tracking area represented by the presence-in-area status of the terminal, based on the correspondence information,
   wherein, when identifying the presence-in-area status of the terminal, the device identifies the presence-in-area status of the terminal by acquiring a tracking area according to a tracking area update from the terminal, and
   wherein, when assigning the slice, the device assigns the slice corresponding to the service used by the terminal and the tracking area according to the tracking area update based on the correspondence information with acquisition of the tracking area in the presence-in-area status identifying step as a trigger.

2. The slice assignment method according to claim 1, wherein, when assigning the slice, the device assigns the slice corresponding to the service used by the terminal and the tracking area represented by the presence-in-area status based on a new correspondence information with acquisition of the new correspondence information as a trigger.

3. The slice assignment method according to claim 2,
   wherein the device is able to communicate with a communication device that transmits a tracking area list to the terminal, and
   wherein, when assigning the slice, the device transmits the tracking area of the correspondence information to the communication device.

* * * * *